(12) United States Patent
Nakano et al.

(10) Patent No.: US 8,069,646 B2
(45) Date of Patent: Dec. 6, 2011

(54) GAS TURBINE SYSTEM HAVING AN AIR INTAKE BYPASS SYSTEM AND AN AIR DISCHARGE BYPASS SYSTEM

(75) Inventors: Yuki Nakano, Hitachi (JP); Yukinori Katagiri, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1085 days.

(21) Appl. No.: 11/849,499

(22) Filed: Sep. 4, 2007

(65) Prior Publication Data
US 2008/0060345 A1    Mar. 13, 2008

(30) Foreign Application Priority Data
Sep. 7, 2006    (JP) ................... 2006-242313

(51) Int. Cl.
*F02G 1/00*    (2006.01)
*F02G 3/00*    (2006.01)
(52) U.S. Cl. .................... 60/39.511; 60/39.53
(58) Field of Classification Search ........... 60/39.511, 60/39.53, 775, 728
See application file for complete search history.

(56) References Cited

U.S. PATENT DOCUMENTS

| 6,981,360 | B2 * | 1/2006 | Yagi et al. | 60/39.5 |
| 7,444,819 | B2 * | 11/2008 | Shibata et al. | 60/775 |
| 2003/0014977 | A1 * | 1/2003 | Doebbeling et al. | 60/775 |
| 2004/0060277 | A1 * | 4/2004 | Hatamiya et al. | 60/39.53 |
| 2005/0097881 | A1 * | 5/2005 | Shibata et al. | 60/39.511 |
| 2005/0109033 | A1 * | 5/2005 | Braun et al. | 60/772 |
| 2007/0017227 | A1 * | 1/2007 | Horiuchi et al. | 60/775 |
| 2008/0229755 | A1 * | 9/2008 | Koganezawa et al. | 60/775 |

FOREIGN PATENT DOCUMENTS

| JP | 61-066019 | 4/1986 |
| JP | 08-042360 | 2/1996 |
| JP | 2000-054857 | 2/2000 |
| JP | 2002-371860 | 12/2002 |
| JP | 2005-307861 | 11/2005 |

* cited by examiner

*Primary Examiner* — William Rodriguez
*Assistant Examiner* — Young Choi
(74) *Attorney, Agent, or Firm* — Mattingly & Malur, P.C.

(57) ABSTRACT

A pressure vessel bypass valve forms a bypass system for enabling a part of the air compressed by a compressor to directly flow into a combustor while preventing the part of the air from flowing through a humidification tower and a recuperator. A turbine bypass valve forms another bypass system for enabling a part of a humidified air to be discharged to an exhaust duct after a heat exchange between the humidified air and a turbine exhaust gas is performed in the recuperator while preventing the part of the humidified air from flowing through a turbine. A turbine control system controls the bypass valves to be opened and closed in accordance with increase and decrease of the load.

7 Claims, 2 Drawing Sheets

GAS TURBINE SYSTEM HAVING AN AIR INTAKE BYPASS SYSTEM AND AN AIR DISCHARGE BYPASS SYSTEM

BACKGROUND OF THE INVENTION

The present invention relates to a gas turbine system, particularly a gas turbine system preferably applicable to a high humidity electric power generating plant in which a humidity of a gaseous matter to be supplied to a gas turbine is increased to improve an output power and an efficiency.

A high humidity gas turbine system in which water is injected into a gaseous matter (air) to be supplied to a gas turbine so that an output power and an efficiency are improved, is of high efficiency in comparison with a conventional gas turbine electric power generating plant, and is expected to be used in a compact electric generator for a factory or a cogeneration system. Further, since a flexible operation for a daily start-stop and load variation is needed in the compact electric generating plant or the like, an improvement in load following operation is desired.

A high humidity gas turbine system for the flexible load following operation, including a bypass system bypassing a humidification tower to directly supply a part of air compressed by a compressor to a downstream side of the humidification tower, and a humidifier connected to the bypass system to adjust a humidity of the part of air with a spray injection, is known. (For example, JP-A-2005-307861)

BRIEF SUMMARY OF THE INVENTION

The humidity adjusting means as described in JP-A-2005-307861 has the following problem in a response to the load variation. The high humidity gas turbine system has a distinctive feature of high efficiency for a partial load, because a heat exchange between an exhaust gas discharged from a gas turbine and air for combustion is performed by a recuperator to heat the air for combustion to decrease a fuel consumption in a combustor. For utilizing the distinctive feature at a maximum, in the high humidity gas turbine system, a compressor inlet guide vane is arranged at an upstream side of the compressor to adjust a flow rate of the air to be supplied to the compressor during the partial load operation so that an exhaust temperature during the partial load operation is made close to an exhaust temperature during a normal load operation to improve the efficiency of operation. In the above high humidity gas turbine system, since the compressed air flows to the combustor through large size pressure chambers such as an air cooler, the humidification tower, and the recuperator, the pressure chambers as buffers cause a delay of a response of air to an increase of the load from the partial load operation with a throttled air flow rate, so that a response to the load increase is deteriorated. Further, there is a problem that an excessive thermal capacity of the recuperator restrains the temperature of the air for combustion from decreasing when the load decreases so that a response to the decrease in load is deteriorated.

An object of the present invention is to provide a gas turbine system whose characteristic in response to the load variation such as the load increase or decrease is improved.
(1) For achieving the above object, a gas turbine system comprises a compressor for compressing air, a compressor inlet guide vane for adjusting a flow rate of the air taken into the compressor, a humidification tower for humidifying the air compressed by the compressor, a combustor for combusting a fuel with the air humidified by the humidification tower to generate a combustion gas, a turbine to be driven by the combustion gas, a recuperator for performing a heat exchange between an exhaust gas discharged from the turbine and the humidified air to be supplied from the humidification tower into the combustor, and a controller for controlling an opening degree of the compressor inlet guide vane in accordance with a load of the system to keep a temperature of the exhaust gas high during a partial load operation of the system, wherein the system further comprises an intake bypass system for introducing a part of the air compressed by the compressor directly to the combustor while preventing the part of the air compressed by the compressor from passing through the humidification tower and the recuperator.

According to the above structure, responsiveness to a load variation such as a load increase is improved.
(2) In the above (1), it is preferable that the system further comprises a discharge bypass system for introducing a part of the humidified air into an exhaust duct after the heat exchange between the exhaust gas and the humidified air is performed by the recuperator while preventing the part of the humidified air from passing through the turbine.
(3) In the above (1), it is preferable that the intake bypass system has a valve and an air flow rate controller for controlling an opening degree of the valve to adjust a flow rate of the part of the air to be introduced directly to the combustor through the intake bypass system.
(4) For achieving the above object, a gas turbine system comprises a compressor for compressing air, a compressor inlet guide vane for adjusting a flow rate of the air taken into the compressor, a humidification tower for humidifying the air compressed by the compressor, a combustor for combusting a fuel with the air humidified by the humidification tower to generate a combustion gas, a turbine to be driven by the combustion gas, a recuperator for performing a heat exchange between an exhaust gas discharged from the turbine and the humidified air to be supplied from the humidification tower into the combustor, and a controller for controlling an opening degree of the compressor inlet guide vane in accordance with a load of the system to keep a temperature of the exhaust gas high during a partial load operation of the system, wherein the system further comprises a discharge bypass system for introducing a part of the humidified air into an exhaust duct after the heat exchange between the exhaust gas and the humidified air is performed by the recuperator while preventing the part of the humidified air from passing through the turbine.

According to the above structure, responsiveness to a load variation such as a load decrease is improved.
(5) In the above (4), it is preferable that the discharge bypass system includes a valve and an air flow rate controller for controlling an opening degree of the valve to adjust a flow rate of a remainder part of the humidified air to be introduced to the combustor.

According to the invention, the responsiveness to the load variation such as the load increase or decrease is improved.

Other objects, features and advantages of the invention will become apparent from the following description of the embodiments of the invention taken in conjunction with the accompanying drawings.

DETAILED DESCRIPTION OF THE INVENTION

Hereafter, with reference to FIGS. 1-4, a structure and operation of a gas turbine system of an embodiment of the invention is described.

Figure 1:
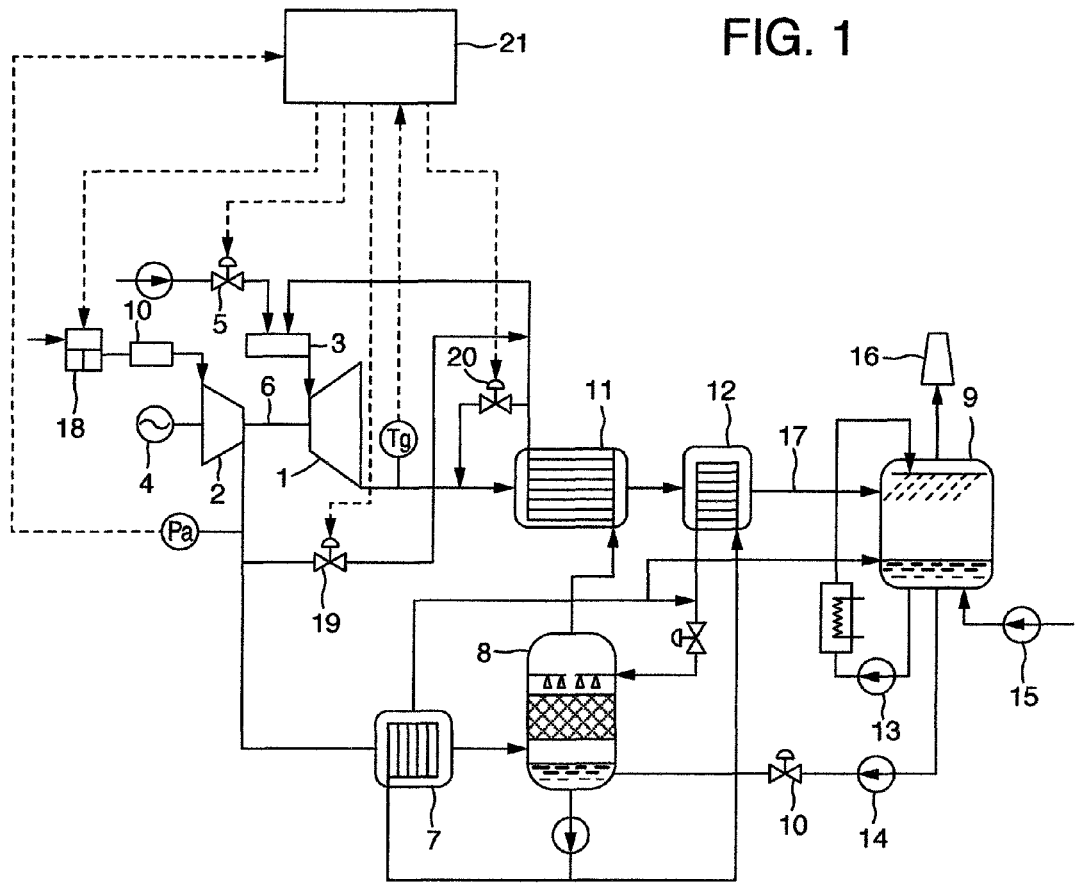
FIG. 1 is a view showing a gas turbine system of an embodiment of the invention.

At first, with reference to FIG. 1, a system structure of a high humidity gas turbine electric generator plant to which the gas turbine system of the embodiment of the invention is applicable, is described.

FIG. 1 is a control system view showing the gas turbine system of the embodiment of the invention.

Air to be used in a combustion for a gas turbine 1 is adjusted by a compressor inlet guide vane 18, subsequently its humidity is increased by an intake air atomizer 10, subsequently the air is compressed by a compressor 2, subsequently a heat exchange for the air is performed in an air cooler 7, subsequently its humidity is increased by a humidification tower 8, and subsequently the air is heated by a recuperator 11. A thermal energy source of the recuperator 11 is an exhaust gas supplied from the gas turbine 1. The thermal energy is absorbed by the air from the recuperator 11 to obtain the air of high temperature and high humidity for combustion.

The fuel whose flow rate is adjusted by a fuel regulating control valve 5 is combusted in a combustor 3 with the air of high humidity and high temperature for combustion. A combustion gas formed by the fuel and the air with the vapor drives the gas turbine 1, and is subsequently discharged as an exhaust gas to an outside of the turbine through an economizer 12 and a gas duct 17. A thermal energy of the exhaust gas discharged to the outside of the turbine is collected by a recuperator 11 to heat the air for combustion.

The humidity included in the combustion exhaust gas is collected by a water recovery system 9. As a system for collecting the water, water is sprayed in the gas duct 17 to condense the humidity in the gas so that the water drops to be collected are formed. The exhaust gas is discharged into the atmosphere through a stack 16 after collecting the water.

A driving force generated by the gas turbine is transmitted to the compressor 2 and a generator 4 through a shaft 6. A part of the driving force is used to pressurize the air in the compressor. Further, the generator 4 converts the driving force to an electric power.

Incidentally, the water collected by the water recovery system 9 is stored by a water collecting tank and supplied by pumps 13 and 14 to the spray and the water recovery system 9 to be reused as a humidification water for the spray and a sprayed water for the water recovery system 9. The water discharged to the atmosphere through the stack 16 is recovered by a make-up water pump 15.

The gas turbine system as shown in FIG. 1 includes a pressure container bypass valve 19 for enabling a part of the air compressed by the compressor to flow directly to the combustor while preventing the part of the air flowing through the humidification tower 8 and the recuperator 11, a turbine bypass valve 20 for enabling a part of the humidified air to be discharged to an exhaust duct while preventing the part of the humidified air from flowing through the turbine 1 after the heat exchange between the humidified air and the turbine exhaust gas is performed in the recuperator 11, and a turbine control system 21 for controlling operations of the bypass valves 19 and 20 as described below.

Figure 2:
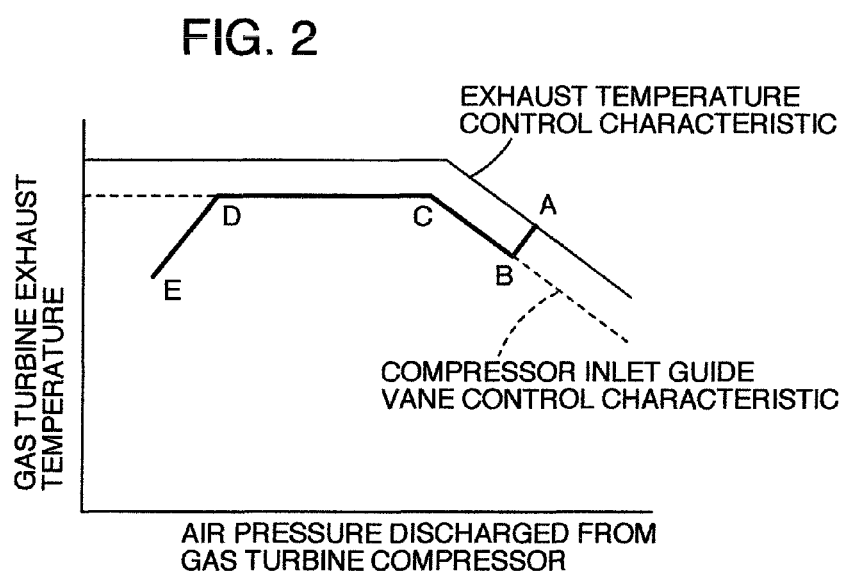
FIG. 2 is a diagram showing a condition adjusted by a compressor inlet guide vane in the gas turbine system of the embodiment of the invention.

With reference to FIG. 2, a control of the compressor inlet guide vane to be used in a case where the load of the gas turbine system of the embodiment is decreased from the normal load operation is described.

FIG. 2 is a control explanation view of the compressor inlet guide vane in the gas turbine system of the embodiment of the invention. In FIG. 2, an abscissa corresponds to an air pressure at an outlet of the gas turbine compressor, and an ordinate corresponds to a temperature of the exhaust gas of the gas turbine.

In FIG. 2, a solid line denotes an exhaust gas temperature control characteristic as a control function to be used for a rated load operation. A dotted line denotes a compressor inlet guide vane control characteristic as a control function to be used for a partial load operation.

Point A in FIG. 2 is on the control function (solid line) to be used for the rated load operation, and the flow rate of the fuel is controlled at the point A during the rated load operation. When the operational condition changes from the point A to the partial load operation, at first, an opening degree of the compressor inlet guide vane 18 is kept the same as the opening degree at the A point, and the fuel control valve 5 is throttled to decrease the load so that the operational condition moves to point B on the control function (dotted line) for the partial load operation. In this case, since the fuel supply rate is decreased while the flow rate of the air is kept constant, a temperature of the exhaust gas decreases.

When the load is decreased further, the operational condition moves from the point B to a point C, and subsequently to point D. At the point D, the opening degree of the compressor inlet guide vane 18 is minimum, and when the load is further decreased from the point D, the fuel control valve 5 needs to be throttled further so that a setting value of the exhaust temperature decreases simply from the point D to a point E.

By changing the opening degree of the compressor inlet guide vane 18 to adjust the air flow rate as the exhaust temperature is controlled on the control characteristic shown by the dotted line, the exhaust temperature is kept high during the partial load operation. Therefore, a heat exchange amount between the exhaust gas and the air for combustion in the recuperator is increased to decrease a fuel consumption in the combustor 3, so that a turbine efficiency is improved and during the partial load operation, an electric power generating efficiency obtainable when the compressor inlet guide vane control is used is improved by 0.5-1.0% in comparison with that obtainable when the compressor inlet guide vane control is not used.

As described above, when the compressor inlet guide vane control is used, an intake air flow rate of the compressor is throttled in the partial load operation. In the high humidity gas turbine system, since the air compressed by the compressor 2 flows into the combustor 3 through the air cooler 7, the humidification tower 8 and the recuperator 11, these pressure chambers act as the buffers causing the delay in the air response when the air flow rate is increased in accordance with an increase of the load.

Therefore, in this embodiment, when the load increases, the turbine control system opens the pressure vessel bypass valve 19 to enable the part (about 10%) of the air controlled by the compressor inlet guide vane 18 and compressed by the compressor 2 to flow through the bypass valve 19 connecting an outlet of the compressor and an inlet of the combustor into the combustor 3 while being prevented from being humidified. A remainder part (about 90%) of the air flows through the air cooler 7, the humidification tower 8 and the recuperator 11 into the combustor so that a response of the air to an ordered load is delayed. But, the bypassing air causes temporarily an increase of the air flow rate to compensate the response delay of the air. Therefore, a deterioration in responsiveness to the ordered load increase as caused by the delay in air flow rate increase is compensated for.

The delay in air flow rate response occurs even when the load decreases. When the load decreases, since a thermal capacity of the recuperator 11 is significantly great, the temperature of the air flowing into the combustor 3 is restrained from decreasing to cause a delay in response to the load decrease.

Therefore, in the embodiment, when the load decreases, the turbine control system 21 opens the turbine bypass valve 20 to enable the part (about 10%) of the air flowing toward the combustor 3 from the recuperator 11 to be discharged through the opened turbine bypass valve 20 connecting the outlet of the recuperator and the exhaust duct so that a delay in temperature decrease of the air for combustion is compensated by decreasing temporarily the flow rate of the air flowing into the combustor 3.

Figure 3:
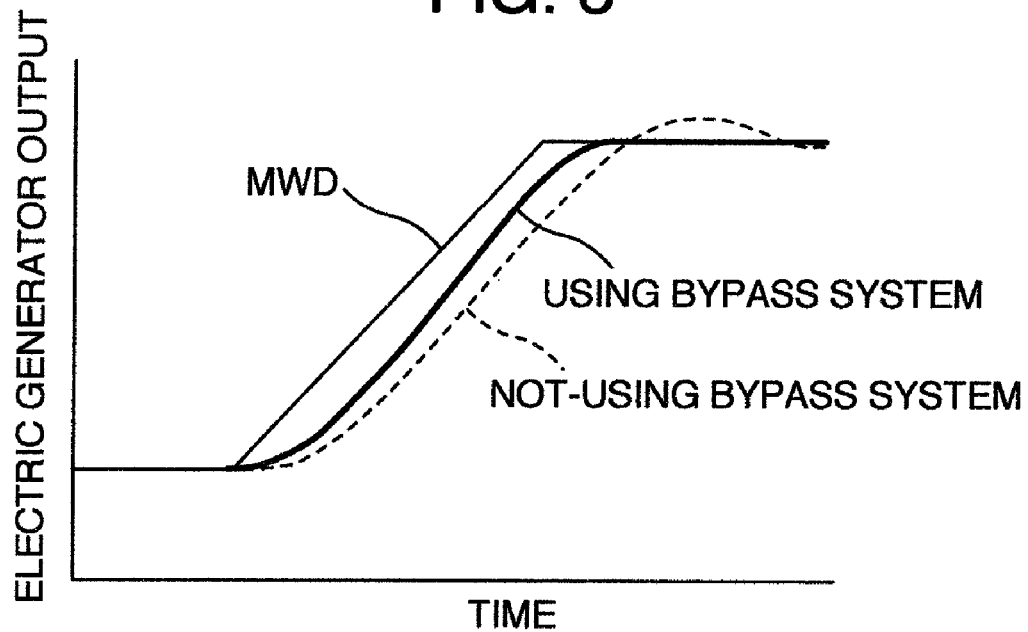
FIG. 3 is a diagram showing a relationship between a time proceeding and a generator output obtainable during a change from a partial load operation to a normal load operation in the gas turbine system of the embodiment of the invention.
Figure 4:
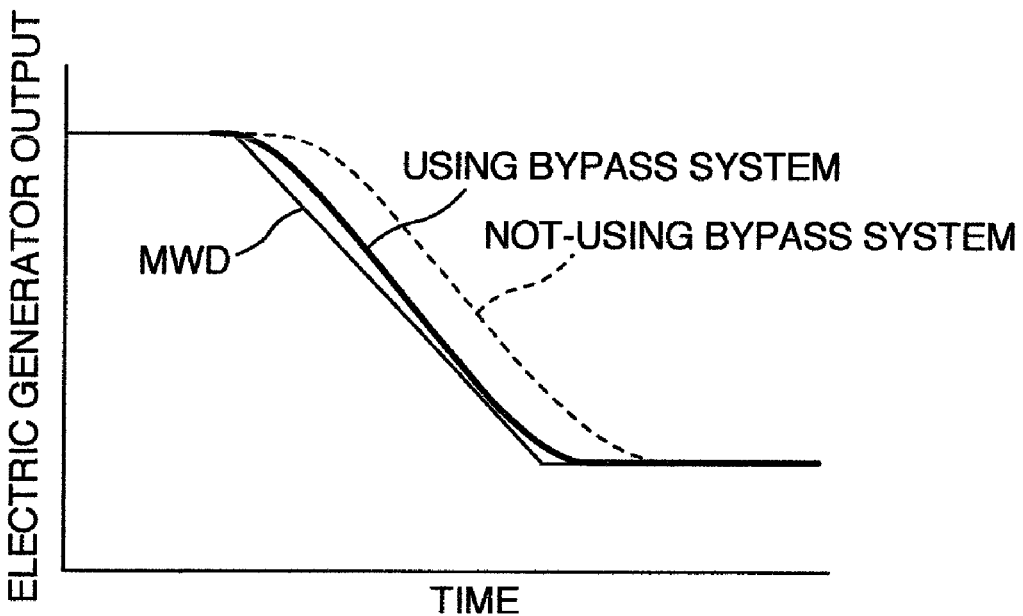
FIG. 4 is a diagram showing a relationship between a time proceeding and a generator output obtainable during a change from the normal load operation to the partial load operation in the gas turbine system of the embodiment of the invention.

With reference to FIGS. 3 and 4, an operation and effect of the embodiment are described.

FIG. 3 is a time chart of an output power of the generator obtainable when the operational condition is changed from the partial load operation to the rated load operation in the gas turbine system of the embodiment. FIG. 4 is a time chart of the output power of the generator obtainable when the operational condition is changed from the rated load operation to the partial load operation in the gas turbine system of the embodiment.

With reference to FIG. 3, the operation and effect of the bypass system connecting the outlet of the compressor and the inlet of the combustor to each other when the load increases are described.

In FIG. 3, MWD denotes an ordered electric power to be generated. A thick solid line denotes the output power of the generator obtainable when the bypass system is used in the embodiment, and a dotted line denotes the output power of the generator obtainable when the bypass system is not used in the embodiment.

In this embodiment, when the ordered load is increased, the pressure vessel bypass valve 19 is opened to enable the part (about 10%) of the air discharged from the compressor to bypass the pressure vessels to increase temporarily the flow rate of the air flowing into the combustor so that as shown by the thick solid line in FIG. 3, the response to the load is improved. When the load reaches the vicinity of a desired load, the bypass valve is closed to adjust the flow rate of the air to restrain an overshoot in response so that the load reaches the desired load and decrease a time period for reaching the rated load in comparison with a case where the bypass system is not used.

In FIG. 4, MWD denotes the ordered electric power to be generated. A thick solid line denotes the output power of the generator obtainable when the bypass system is used in the embodiment, and a dotted line denotes the output power of the generator obtainable when the bypass system is not used in the embodiment.

In this embodiment, when the ordered load is decreased, the turbine bypass valve 20 is opened to enable the part (about 10%) of the air discharged from the compressor to be discharged to the exhaust duct to decrease temporarily the flow rate of the air flowing into the combustor so that the delay in response to the load caused by the delay in temperature decrease of the air in accordance with excessiveness in thermal capacity of the recuperator is improved, and a time period for reaching the partial load is decreased in comparison with a case where the bypass system is not used.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A gas turbine system comprising a compressor for compressing air, a compressor inlet guide vane for adjusting a flow rate of the air taken into the compressor, a humidification tower for humidifying the air compressed by the compressor, a combustor for combusting a fuel with the air humidified by the humidification tower to generate a combustion gas, a turbine driven by the combustion gas, a recuperator for performing a heat exchange between an exhaust gas discharged from the turbine and the humidified air to be supplied from the humidification tower into the combustor, and a controller for controlling an opening degree of the compressor inlet guide vane in accordance with a load of the system to keep a temperature of the exhaust gas high during a partial load operation of the system, wherein the system further comprises an intake bypass system for introducing a part of the air compressed by the compressor directly to the combustor while preventing said part of the air compressed by the compressor from passing through the humidification tower and the recuperator, and wherein the system further comprises a discharge bypass system for introducing a part of the humidified air after the heat exchange between the exhaust gas and the humidified air is performed by the recuperator into an exhaust duct while preventing said part of the humidified air from passing through the turbine.

2. The gas turbine system according to claim 1, wherein the intake bypass system has a valve and an air flow rate controller for controlling an opening degree of the valve to adjust a flow rate of the part of the air to be introduced directly to the combustor through the intake bypass system.

3. The gas turbine system according to claim 1, wherein the exhaust gas is discharged through the exhaust duct from the turbine.

4. A gas turbine system comprising a compressor for compressing air, a compressor inlet guide vane for adjusting a flow rate of the air taken into the compressor, a humidification tower for humidifying the air compressed by the compressor, a combustor for combusting a fuel with the air humidified by the humidification tower to generate a combustion gas, a turbine driven by the combustion gas, a recuperator for performing a heat exchange between an exhaust gas discharged from the turbine and the humidified air to be supplied from the humidification tower into the combustor, and a controller for controlling an opening degree of the compressor inlet guide vane in accordance with a load of the system to keep a temperature of the exhaust gas high during a partial load operation of the system, wherein the system further comprises a discharge bypass system for introducing a part of the humidified air after the heat exchange between the exhaust gas and the humidified air is performed by the recuperator into an exhaust duct while preventing said part of the humidified air from passing through the turbine.

5. The gas turbine system according to claim 4, wherein the discharge bypass system includes a valve and an air flow rate controller for controlling an opening degree of the valve to adjust a flow rate of a remainder part of the humidified air to be introduced to the combustor.

6. A gas turbine system comprising a compressor for compressing air, a compressor inlet guide vane for adjusting a flow rate of the air taken into the compressor, a humidification tower for humidifying the air compressed by the compressor, a combustor for combusting a fuel with the air humidified by the humidification tower to generate a combustion gas, a turbine driven by the combustion gas, a recuperator for performing a heat exchange between an exhaust gas discharged from the turbine and the humidified air to be supplied from the humidification tower into the combustor, and a controller for controlling and opening degree of the compressor inlet guide vane, wherein the system further comprises a bypass path connected fluidly between the combustor and the recuperator and connected fluidly between the turbine and the recuperator to bypass the combustor to enable a part of the humidified air to be mixed with the exhaust gas discharged from the turbine to the recuperator while the part of the humidified air after passing through the at least one recuperator and the humidification tower is prevented from passing through the combustor.

7. The gas turbine system according to claim 6, wherein the second bypass path has a valve for controlling a flow rate therethough.

\* \* \* \* \*